United States Patent

Kelch

(10) Patent No.: US 6,474,918 B1
(45) Date of Patent: Nov. 5, 2002

(54) ANTI-CROSS THREADING DEVICE

(75) Inventor: Richard E. Kelch, Kettering, OH (US)

(73) Assignee: Ashton Plastic Products, Inc., Xenia, OH (US)

( * ) Notice: Subject to any disclaimer, the term of this patent is extended or adjusted under 35 U.S.C. 154(b) by 49 days.

(21) Appl. No.: 09/662,736

(22) Filed: Sep. 15, 2000

Related U.S. Application Data

(60) Provisional application No. 60/215,252, filed on Jun. 30, 2000.

(51) Int. Cl.⁷ .............................. F16B 25/00; F16B 37/04
(52) U.S. Cl. ........................ 411/180; 411/386; 411/436
(58) Field of Search ................................ 411/386, 436, 411/437, 34–38, 179–191

(56) References Cited

U.S. PATENT DOCUMENTS

| | | | | |
|---|---|---|---|---|
| 447,775 A | * | 3/1891 | Higbee | 411/386 X |
| 2,392,133 A | * | 1/1946 | Eklund | 411/34 |
| 3,030,705 A | * | 4/1962 | Gill | 411/34 X |
| 4,842,462 A | * | 6/1989 | Tildesley | 411/180 |
| 5,320,467 A | * | 6/1994 | Erbes | 411/386 |
| 5,335,411 A | * | 8/1994 | Muller | 411/180 X |
| 5,609,455 A | | 3/1997 | McKewan | |
| 5,704,749 A | * | 1/1998 | Landgrebe | 411/386 X |
| 5,730,566 A | | 3/1998 | Goodwin et al. | |
| 5,791,849 A | | 8/1998 | Goodwin et al. | |
| 5,836,731 A | | 11/1998 | Goodwin et al. | |
| 5,928,395 A | * | 7/1999 | Glen et al. | 411/386 X |

FOREIGN PATENT DOCUMENTS

| | | | | |
|---|---|---|---|---|
| GB | 2041136 | * | 9/1980 | 411/180 |

\* cited by examiner

*Primary Examiner*—Neill Wilson
(74) *Attorney, Agent, or Firm*—Killworth, Gottman, Hagan & Schaeff LLP

(57) ABSTRACT

The present invention permits a screw or male member to align prior to entering a threaded section and being driven. This alignment can avoid cross threading of the screw and the internal threads as often happens with power driven screws. The present invention generally includes a device with an unthreaded section and a threaded section. A screw or male member passes through the unthreaded section prior to entering the threaded section and causes the screw or male member to be aligned before being driven.

6 Claims, 2 Drawing Sheets

ANTI-CROSS THREADING DEVICE

CROSS REFERENCE TO RELATED APPLICATIONS

This application claims the benefit of U.S. Provisional Patent Application No. 60/215,252, filed Jun. 30, 2000.

BACKGROUND OF THE INVENTION

One problem that assemblers, machine builders, manufacturers, mechanics and the like have is cross threading internal threads. When assembling of devices was performed by hand, cross threading of internal threads did not occur frequently. But, products are now increasingly assembled using power devices. Cross threading occurs more frequently when using powered devices such as electric screw drivers and power guns.

FIG. 1 illustrates a screw 101 and a conventional insert 102. The conventional insert has internal threads 103 extending from top to bottom. The screw 101 has external threads 104 which match the internal threads 103 of the insert. The screw 101 is shown slightly mis-aligned with respect to the insert 102. Any turning or driving of the screw 101 will likely cause cross threading of the internal threads 103 or the external threads 104.

Cross threading of internal threads can be especially problematic for fixed devices and inserts as opposed to nuts. Once a device has female threads and they become cross threaded, the device may be unusable. Cross threaded inserts can be extremely difficult or impossible to remove or replace. Often, cross threading internal threads means that the part needs to be disposed of which could be a very costly problem. Cross threading or the occurrences of cross threading need to be reduced.

Accordingly, there is a need in the art for a device which reduces cross threading.

SUMMARY OF THE INVENTION

This need is met by the present invention. An anti-cross threading device is disclosed. The device includes an element, a cylindrical cavity, an unthreaded section and a threaded section. The element has an exterior surface. The cylindrical cavity is in the element extending from the surface to a first length. The cylindrical cavity has an interior surface. An unthreaded section of the interior surface extends from the element surface to a second length. The threaded section of the interior surface extends from the second length to the first length.

Other devices and methods of fabrication are disclosed.

The present invention permits a screw or male member to align prior to entering a threaded section. This alignment can avoid cross threading.

DETAILED DESCRIPTION

Figure 1:
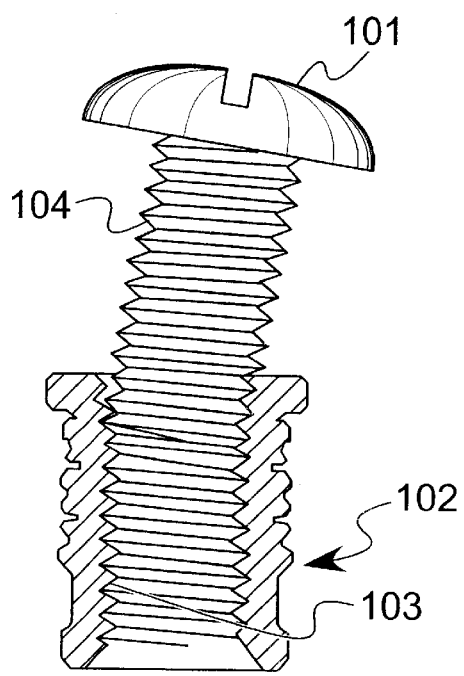
FIG. 1 illustrates a cross sectional view of a conventional screw and insert.
Figure 2:
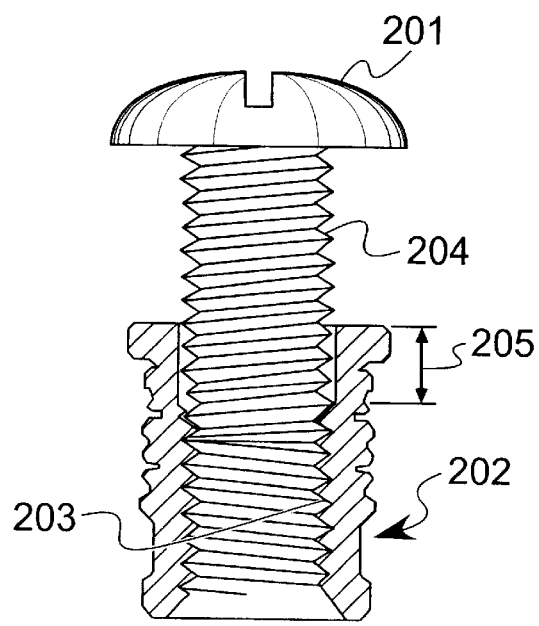
FIG. 2 illustrates a cross sectional view of a screw and anti-cross threading insert according to one embodiment of the invention.

FIG. 2 illustrates a screw 201 and an anti-cross threading insert 202 according to one embodiment of the invention. The anti-cross threading insert 202 includes an unthreaded section 205 and internal threads 203. The internal threads 203 correspond to the external threads 204. The unthreaded section 205 is at least as wide as the major diameter of screw 201. The screw 201 will not be misaligned before the external threads 204 encounter the internal threads 203 and thus, prevent cross threading of the internal threads 203 or the external threads 204. This contrasts to the prior art FIG. 1, where the screw 101 should be aligned with the insert 102 prior to entering the insert 102 to avoid cross threading of the internal threads 103 or the external threads 104.

Figure 3:
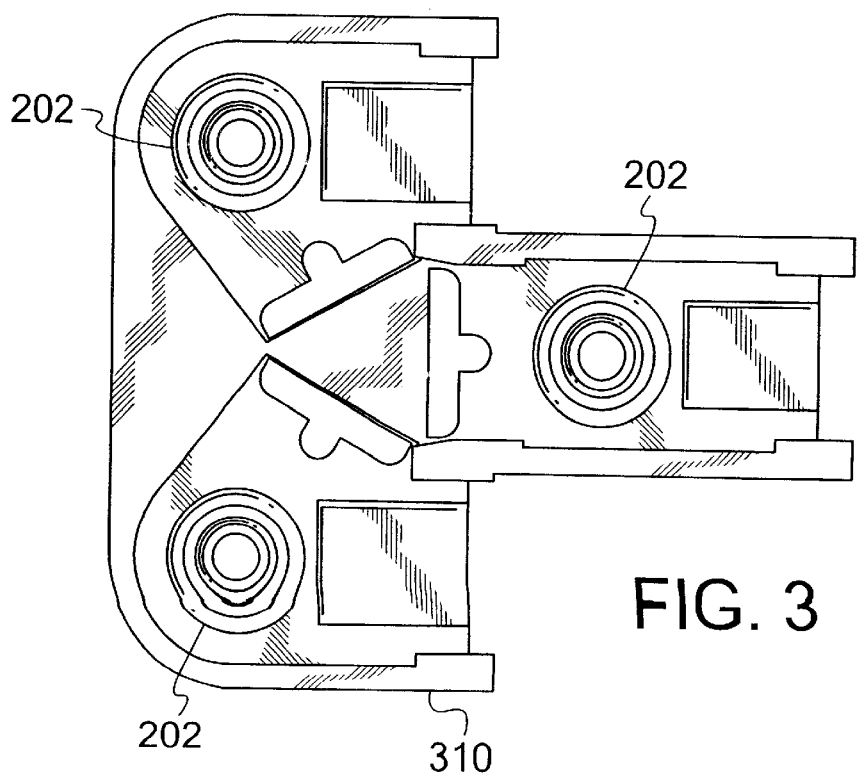
FIG. 3 illustrates an assembly utilizing anti-cross threading inserts according to another embodiment of the invention.

FIG. 3 illustrates an assembly 310 utilizing anti-cross threading inserts 202 according to another embodiment of the invention. The anti-cross threading inserts 202 are inserted into the assembly 310 as shown. Another assembly or part (not shown) can be attached to the assembly 310 by driving a conventional screw (not shown) into at least one of the anti-cross threading inserts 202.

Figure 4:
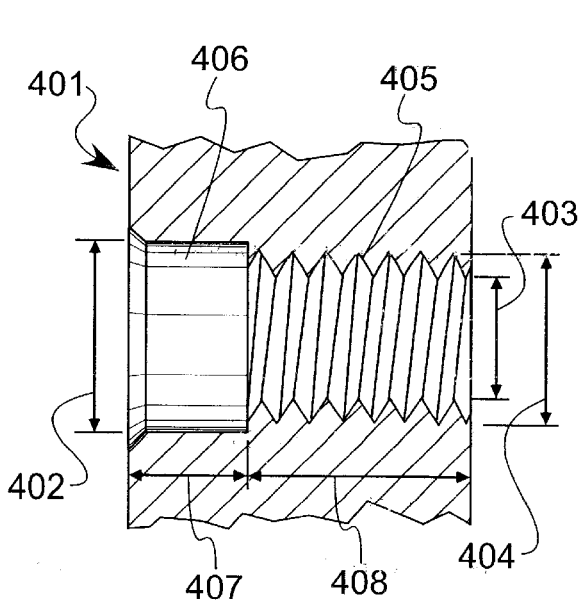
FIG. 4 illustrates a cross sectional view a an anti-cross threading element according to another embodiment of the invention.

FIG. 4 illustrates a cross section of an anti-cross threading element according to another embodiment of the invention. The element is located or formed in a structure 401. The structure can be a some type of device or a sheet of material or any other structure that utilizes internal threading. The element comprises an unthreaded section 406 and a threaded section 405. The unthreaded section has a length 407 and a diameter 402. The unthreaded section 406 is tapered at the surface in this embodiment, but other embodiments may not have the unthreaded section tapered. The threaded section has a length 408 and an inner diameter 403 and an outer diameter 404 of the threads. The unthreaded section 406 diameter is greater than or equal to the outer diameter 404 of the threaded section 405. The unthreaded section length 407 and threaded section length 408 can vary according to the application. Additionally, the inner diameter 403 and outer diameter 404 can vary according to the application. Further, the threads in the threaded section are not limited to any specific size, style or shape of threads.

Figure 5:
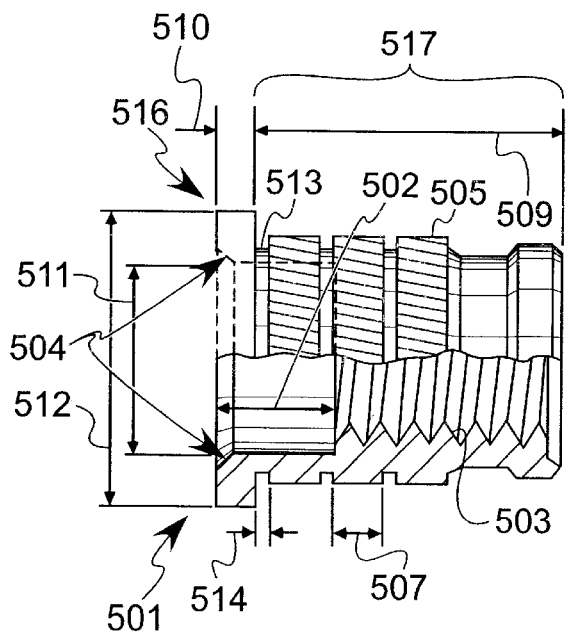
FIG. 5 illustrates an anti-cross threading insert according to another embodiment of the invention.
Figure 5A:
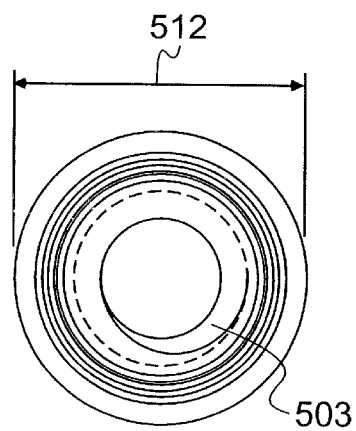

FIGS. 5A and 5B illustrate an anti-cross threading insert according to another embodiment of the invention. The exterior of the insert includes a lip 516 and a lower portion 517. The lip 516 is at a first end of the insert into which a screw may enter. When the insert is used in an assembly, the lip 516 remains outside the assembly and limits the depth the insert is seated prior to a screw being driven into the insert. For this embodiment, the lip 516 has a length 510 of approximately 0.043 inches. The lip 516 has an outer diameter 512 of 0.307–0.315 inches. The lower portion 517 is adjacent to the lip 516 and is located along the same axis. The other end of the lower portion 517 is a second end of the insert. For this embodiment, the lower portion 517 includes three knurl 505 having a diameter of 0.256–0.259 inches and having a length 507 of 0.054 inches. The knurls 505 assist in gripping a base material. Between each knurl 505 is an unknurl section having a diameter 513 of 0.234 and a length 514 of 0.014.

The insert 501 includes an interior having an unthreaded portion 502 and a threaded portion 503. The unthreaded portion 502 allows a screw to be aligned prior to entering or driving into the threaded portion 503. The unthreaded portion 502 is located at the first end of the insert. The unthreaded portion 502 has a length of 0.100 inches in this embodiment. Typically, the unthreaded portion 502 has a length of approximately 2–3 threads. For this embodiment, the unthreaded portion has a diameter of 0.195 inches. Additionally, the unthreaded portion 502 includes a chamfer 504, a shallow angled cut, at the first end of the insert. The chamfer 504 has a 45° angle cut. However, other angles and sizes may be used for the chamfer 504.

The threaded portion 503 is axial and adjacent to the unthreaded portion 502 and ends at the second end. The threaded portion 503 includes internal threads. For this embodiment, the threads of the threaded portion 503 are STD national threads form class 2B fit. The threads are 10–32 threads and have a maximum eccentricity between internal and outer diameters of 0.002 T.I.R. The insert has a length of 0.370 inches from the first end to the second end.

In this particular embodiment, the insert is comprised of brass. Other embodiments may utilize other materials such as aluminum, steel, plastic and the like. The insert 501 may prevent or reduce the occurrence of cross threading of internal threads.

Figure 6:
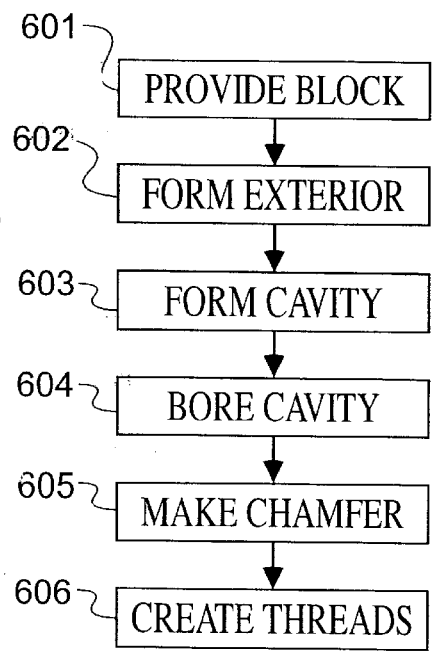
FIG. 6 illustrates a method for fabricating an anti-cross threading device according to another embodiment of the invention.

FIG. 6 illustrates a method for fabricating an anti-cross threading device according to one embodiment of the invention. A block of material is provided at 601. The block of material can be an insert, nut, sheet of material or the like. Exterior features of the anti-cross threading device are formed on an outer surface of the block at 602. The exterior features can include a head, shank, knurl and the like. A cylindrical cavity is formed in the block of material at 603. The cylindrical cavity has a first diameter and a first depth. The first diameter is selected according to thread size. The first depth is selected to allow a screw or threaded male member to be securely attached to the anti-cross threading device. The cylindrical cavity is counter bored to a second depth and a second diameter forming an unthreaded section at block 604. The second depth is less than the first depth and the second diameter is greater than or equal to the first diameter. A chamfer may be bored into the unthreaded section at block 605. Threads are created in the remaining area or threaded area of the cavity at block 606. The threads can be created by tapping. The threaded area is the portion of the cylindrical cavity that is not counter bored.

Having described the present invention in detail and by reference to various embodiments thereof, it will be apparent that modifications and variations are possible without departing from the scope of the invention. The described embodiments and variations can be used to reduce the occurrence of cross threading and can properly align screws prior to setting screws. They may prevent screws from being inserted at an undesirable angle. They may also increase the speed and quality with which devices are manufactured. The embodiments and variations are especially helpful when power tools such as power guns are being used to drive screws into internal threads. The various embodiments can be used in the case of inserts in molded thermoset and thermoplastic plastic parts. The various embodiments can also be used in other materials which require threaded holes and are not limited to inserts.

What is claimed is:

1. An anti-cross threading insert comprising:

a cylindrical housing having an interior surface, an exterior surface, a first end and a second end;

a lip formed on the exterior surface at the first end;

a lower portion on the exterior surface extending from the lip to the second end, wherein the lower portion of the exterior surface further comprises a gripping section;

an unthreaded section formed on the interior surface at the first end; and a threaded section formed on the interior surface from the unthreaded section to the second end.

2. The anti-cross threading insert of claim 1, wherein the gripping section comprises a plurality of knurls.

3. The anti-cross threading insert of claim 2, wherein the plurality of knurls comprises three knurls.

4. An anti-cross threading insert comprising:

a cylindrical housing having an interior surface, an exterior surface, a first end and a second end;

a lip formed on the exterior surface at the first end;

a lower portion on the exterior surface extending from the lip to the second end;

an unthreaded section formed on the interior surface at the first end; and a threaded section formed on the interior surface from the unthreaded section to the second end, wherein the threaded section has threads with an inner diameter and an outer diameter and the unthreaded section has an outer diameter greater than the outer diameter of the threads.

5. The anti-cross threading insert of claim 4, wherein the unthreaded section has a length corresponding to 2–3 threads of the threaded section.

6. The anti-cross threading insert of claim 4, wherein the unthreaded section has a length of approximately 0.100 inches and the threaded section has a length of approximately 0.270 inches and 10–32 threads.

* * * * *